United States Patent [19]
Friedrichs

[11] Patent Number: 5,780,063
[45] Date of Patent: Jul. 14, 1998

[54] APPARATUS FOR PRODUCING A HARD METAL OR CERAMIC ROD HAVING HELICAL BORES

[75] Inventor: Arno Friedrichs, Hamburg, Germany

[73] Assignees: Konrad Friedrichs KG, Kulmbach; Gottlieb Gühring KG, Ebingen, both of Germany

[21] Appl. No.: 469,367

[22] Filed: Jun. 6, 1995

Related U.S. Application Data

[62] Division of Ser. No. 340,449, Nov. 14, 1994, Pat. No. 5,601,857, which is a continuation of Ser. No. 725,596, Jul. 3, 1991, abandoned.

[30] Foreign Application Priority Data

Jul. 5, 1990 [DE] Germany .......................... 40 21 383.8
Jun. 19, 1991 [DE] Germany .......................... 41 20 165.5

[51] Int. Cl.⁶ .......................... B29C 47/06; B29C 47/30
[52] U.S. Cl. .......................... 425/131.1; 72/258; 76/5.1; 76/108.6; 264/171.1; 264/173.16; 408/59; 425/133.1; 425/381; 425/382.3; 425/462
[58] Field of Search .......................... 425/461, 130, 425/131.1, 380, 381, 382.3, 466, 467, 468, 133.1, 462; 264/75, 103, 167, 171.1, 211, 209.2, 173.16; 72/258, 259, 260, 264; 76/5.1, 108.6; 408/59

[56] References Cited

U.S. PATENT DOCUMENTS

| | | | |
|---|---|---|---|
| 2,138,378 | 11/1938 | Johnson | 425/131.1 |
| 2,174,779 | 10/1939 | Delorme | 264/75 |
| 3,205,692 | 9/1965 | Kemppinen et al. | 72/264 |
| 3,520,966 | 7/1970 | Soffiantini | 425/131.1 |
| 3,651,187 | 3/1972 | Cessna, Jr. | 264/211 |
| 4,120,628 | 10/1978 | Simos | 425/131.1 |
| 4,704,055 | 11/1987 | Guhring | 408/59 |
| 4,779,440 | 10/1988 | Cleve et al. | 72/264 |
| 4,921,414 | 5/1990 | Schliehe et al. | 264/75 |
| 5,049,331 | 9/1991 | Hempel | 425/381 |

*Primary Examiner*—Jay H. Woo
*Assistant Examiner*—Joseph Leyson
*Attorney, Agent, or Firm*—Oblon, Spivak, McClelland, Maier & Neustadt, P.C.

[57] ABSTRACT

An extruder for extrusion manufacturing a rod of hard metal or ceramic with at least one helical inner bore. A plasticized mass of hard metal or ceramic is simultaneously forced through a die and twisted. Either the mass is twisted uniformly over the cross-section of the billet by a spinner immersed in the mass or the spinner is rotated by the mass. The mass emerges either subject to torsion or entirely or mostly without torsion from a smooth downstream channel through the die. A filament-shaped material extends or is injected into the mass to produce the inner bore or bores.

11 Claims, 4 Drawing Sheets

APPARATUS FOR PRODUCING A HARD METAL OR CERAMIC ROD HAVING HELICAL BORES

This is a divisional application of Ser. No. 08/340,449, filed on Nov. 14, 1994, now U.S. Pat. No. 5,601,857, which is a continuation of application Ser. No. 07/725,596, filed on Jul. 3, 1991, now abandoned.

BACKGROUND OF THE INVENTION

The invention relates to a rod of hard metal or ceramic with at least one helical bore extending through it, to a method of manufacturing the rod, whereby a mass of plasticized hard metal or ceramic is forced through a die and simultaneously twisted into a helix, and to an extrusion die aligned with a mandrel for carrying out the method.

Rods of hard metal or ceramic with at least one helical, or twisted, bore extending through it are known, from EP 0 118 035 A1, German 3 600 681 A1, and U.S. Pat. No. 4,059,031 for example. Rods of this type are processed into drill bits, with the bores constituting channels to convey a rinse or coolant. The helical channels are created by appropriate spinners that twist the blank leaving the extruder at a rate calculated in relation to the mass's rate of flow to produce the desired geometry and pitch. This procedure demands, in addition to the extrusion die itself, spinners and appropriate controls. To eliminate these accessories, the aforesaid German 3 600 681 discloses twisting the mass into a helix during the actual extrusion. Extruding and twisting are accordingly carried out simultaneously in a single step. A die with at least one helical web extending in the direction of pressure around its inner surface imposes a radially inward torsion on the billet.

The mandrel in this known extruder terminates downstream of the inside of the die and has one or more elastic pins secured to it that extend into the die. The pins have the diameter of the desired channels. This known method of and device for extruding such rods, however, have several drawbacks. First, the torsion imposed on the billet by the helical webs on the inner surface of the die more or less decelerates radially inward from the billet's outer surface in accordance with the viscosity of the mass and its friction against the die. It is accordingly almost impossible to obtain inner bores with the desired geometry. Although a reproducible torsion is obtainable near the surface of the billet, in the vicinity of the webs, they do not extend very far in. The webs also make it impossible to obtain rods with a smooth surface, and the products exhibit definite undulations. Finally, the extruded ceramic or hard metal is highly abrasive. The webs wear out rapidly and the die must be changed frequently. Regrinding the inside of the die is expensive and increases the cost of the rods.

With the aforesaid state of the art as a point of departure, the object of the present invention is to provide a blank in the form of a rod of hard metal or ceramic with precisely twisted inner bores of a precise tolerance and constant pitch. The surface of the blank will also be smooth enough to eliminate the need for grinding often encountered with known rods to remove the typical undulations. The rods with their twisted inner bores will also be thin enough to reduce the waste of material when the blanks are processed into bits. The manufacturing process will be simpler, more reliable, and less expensive. Another object of the invention is a device for carrying out the method, specifically an extruder, that is simple and compact, that will last, and that will generate a precisely reproducible torsion. The spinners and associated controls employed for further processing into hard-metal or ceramic bits and the complicated dies with webs on their inner surface will no longer be needed.

SUMMARY OF THE INVENTION

How the rods of hard metal or ceramic are manufactured will now be described. A spinner is immersed in the plasticized mass. Either the spinner twists the mass, resulting in a torsion that is radially uniform over the whole cross-section of the billet, or the mass twists the spinner. In the first case the spinner does not rotate and the mass is forced through the die under torsion and emerges from it subject to torsion. The die constitutes a smooth channel. In the second case the spinner rotates and the mass is forced through the die under no or almost no torsion and emerges from it subject to almost no torsion. The helical inner bores can be produced by forcing a filament-like material into the traveling mass. This material is entrained by the twisting mass or spinner. Instead of an elastic material being forced in, elastic filaments, chains, or similar structures can extend into the die in a number equal to the desired number of inner bores. The filament-like material forced into the mass will enter it at the speed the mass is traveling at. The plastic filament material is supplied from outside under pressure.

This material either evaporates readily or can easily be removed by chemical or physical procedures. It will evaporate or be removed prior to sintering. The extruder for carrying out the method is distinguished by a spinner in the form of a screw with one or more threads. It is coaxial with and upstream of the die. The die is a smooth cylindrical channel. The screw accordingly accommodates the total cross-section of the mass traveling through the die, ensuring that the torsion will be uniform throughout the cross-section. The screw is removably accommodates in the extruder and can easily be replaced when worn. The die itself is smooth and its channel is cylindrical and has a smooth inner surface, especially in the vicinity of its outlet. The absence of helical webs on its inner surface limits wear. The screw can be secured non-rotating on its mount and twist the mass as it is forced through. The screw can on the other hand also rotate on its mount and be twisted by the untwisted or almost untwisted mass as it is forced through. The method and device in accordance with the invention will produce rods of hard metal or ceramic with precisely twisted inner bores. Their outer surface will be smooth and lack impressions, depressions, grooves, elevations, etc. The screw employed in this extruder is easy to manufacture, by twisting baffles for example. This feature decreases the cost of the rods of hard metal or ceramic.

BRIEF DESCRIPTION OF THE DRAWINGS

Embodiments of the invention will now be described in detailed by way of example with reference to the drawing, wherein.

DESCRIPTION OF THE PREFERRED EMBODIMENTS

Figure 1:
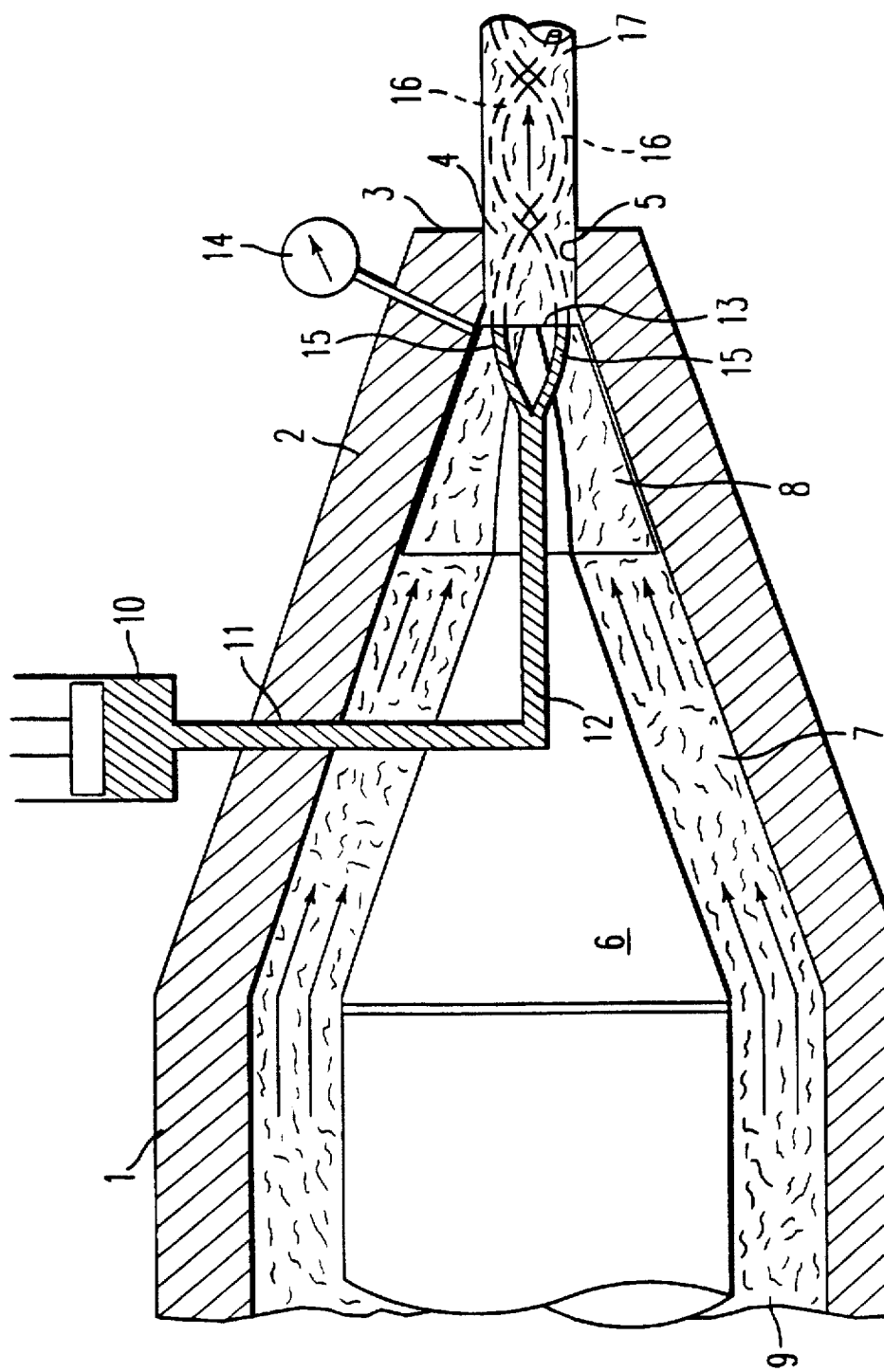
FIG. 1 is a schematic and broken longitudinal section through an extruder.

An extruder has a housing 1 that tapers more or less in the shape of a truncated cone and merges and merges into a die 2. For simplicity's sake the die 2 illustrated in FIG. 1 is represented as integrated into housing 1. It can of course be a separate component inserted in the housing. Die 2 has a cylindrical channel 4 in the vicinity of its exit, outlet 3. The inner surface 5 of the channel is smooth. The diameter of the channel equals that of the rods of hard metal or ceramic manufactured with the extruder. Housing 1 accommodates a coaxial mandrel 6 that also tapers in the shape of a truncated cone toward the outlet 3. Between mandrel 6 and the inner surface of housing 1 accordingly is an annular gap 7 that continuously decreases in diameter downstream. Secured to the end of the mandrel and upstream of cylindrical channel 4 is a spinner 8 in the form of a screw. Spinner 8 can be made out of baffles or similar structures that curve helically in the direction traveled by the mass. The spinner can be rigidly secured to or rotate on mandrel 6, which accordingly acts as its mount. It can have one or more threads. Since spinner 8 extends radially up to the inner surface of housing 1, all the cross-section occupied by extrusion mass 9 will be accommodated by spinner 8. There will, however, always be a slight gap between spinner 8 and the inner surface of housing 1, at least when the spinner rotates on mandrel 6, to allow it to rotate freely.

As will also be evident from FIG. 1, the extruder is also associated with a pressurized reservoir 10. This reservoir contains a material that becomes plastic subject to compression and/or heat and remains plastic over a wide range of pressure and temperature. Reservoir 10 communicates with the inside of the extruder in the vicinity of die 2 by way of channels 11 and 12 that extend into spinner 8 and emerge from it at its downstream edge 13, which faces smooth-surfaced cylindrical channel 4. A pressure gauge 14 is also mounted on the extruder and measures the pressure in the vicinity of downstream edge 13. The perforations 15 through spinner 8 are separated radially at a specific distance from the axis that equals the desired distance between the helical bores in the rods.

The method of manufacturing rods of hard metal or ceramic with helical bores extending through them with the aforesaid extruder will now be described. The mass 9 of plasticized hard metal or ceramic is forced under pressure into the annular gap 7 and arrives at the spinner 8 immersed in it. The mass is twisted as it penetrates a spinner 8 that is stationary, (non-rotating). The mass's torsion or rotation is preserved as the material enters and emerges from smooth cylindrical channel 4. The torsion is characterized by extreme uniformity over the total cross-section of the mass. When the spinner 8 can rotate and accordingly rotates on its own, the penetrating mass twists it while itself rotating very little if at all and leaving die 2 almost without being twisted. The torsion and its extent and the rotation of spinner 8 are extensively governed by the design of the spinner. It can for example have one or more threads with a pitch equalling that of the twisted bores extending through the hard-metal or ceramic rods. A readily evaporating or soluble material is injected into the mass from reservoir 10 by way of channels 11 and 12 and out of the perforations 15 through spinner 8. This material leaves the downstream edge 13 of spinner 8 in the form of filaments that follow the torsion of the mass or spinner. The filaments produce the helical bores 16 that extend through the rod 17 leaving die 2. The filaments will have been eliminated by the time the rods are sintered, leaving a blank with precisely twisted bores. The rate at which the filaments leave the perforations 15 through spinner 8 equals the rate of travel of the mass through the spinner. The force needed to inject the filaments is equal to or slightly higher than the pressure of the mass in the vicinity of the downstream edge 13 of spinner 8 as determined and displayed by pressure gauge 14. A stationary spinner 8 results in a precise torsion on the penetrating mass. A rotating spinner 8 will be precisely twisted by the penetrating mass. The result is rods 17 with precisely twisted inner bores 16 and, due to the advance through smooth cylindrical channel 4, a smooth outer surface.

Figure 2:
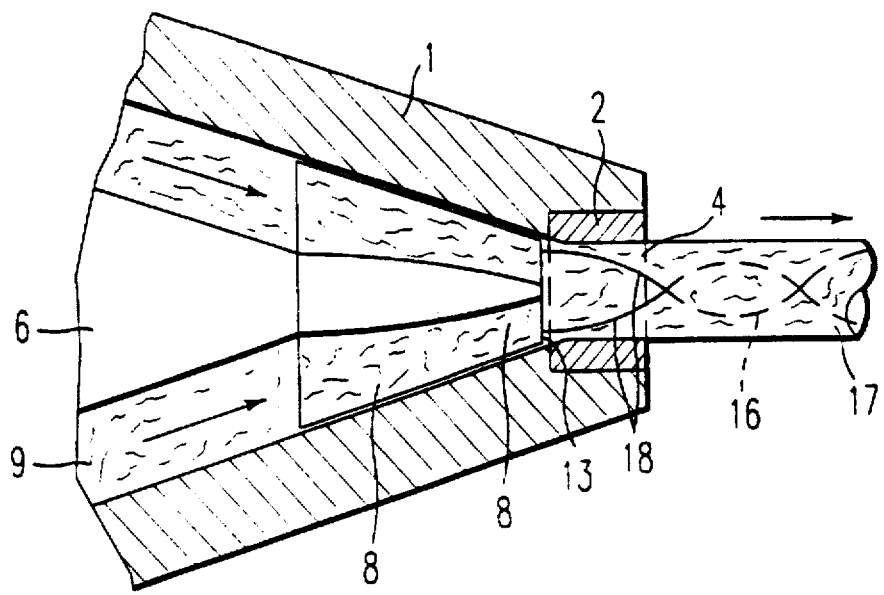
FIG. 2 is a longitudinal section through another embodiment of the extruder.

FIG. 2 illustrates a modified extruder. One elastic or flexible filament 18 for each desired bore through the rod is suspended from the downstream edge 13 of a spinner 8 mounted on mandrel 6. Movable chains for example can be employed instead of elastic filaments 18. A separate die 2 of wear-resistant material with a smooth channel 4 extending through it is inserted in housing 1. As already described herein, either mass 9 is twisted in the vicinity of spinner 8 and arrives subject to torsion in the adjacent channel 4 in die 2 or spinner 8 is rotated by mass 9, which itself remains without torsion or almost without torsion. The elastic filaments 18 suspended from spinner 8 follow the torsion or rotation. The filaments extend all the way through the smooth channel 4 to its outlet. The diameter of the filaments, chains, etc. equals the desired diameter of the bores 16 that extend through the emerging rod 17.

Figure 5:
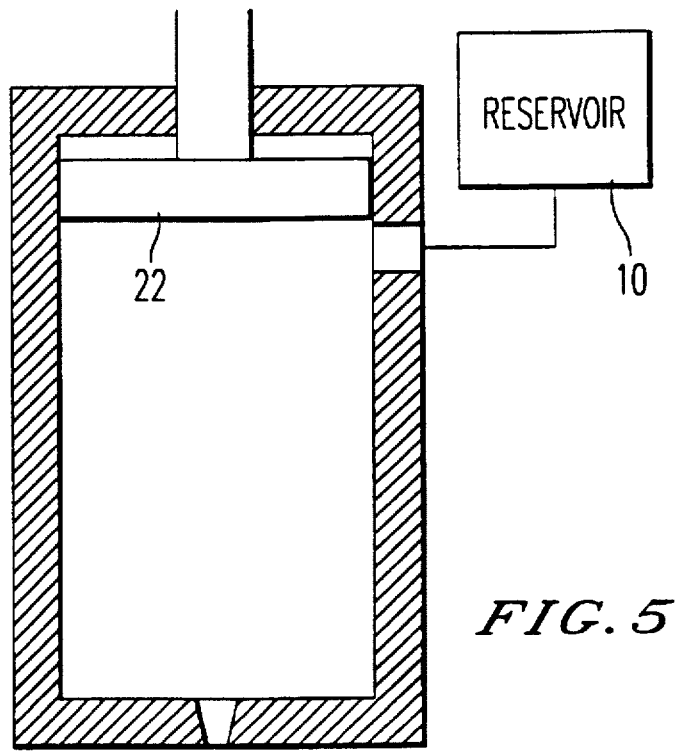
FIG. 5 is a schematic view of the extruder with a piston.
Figure 6:
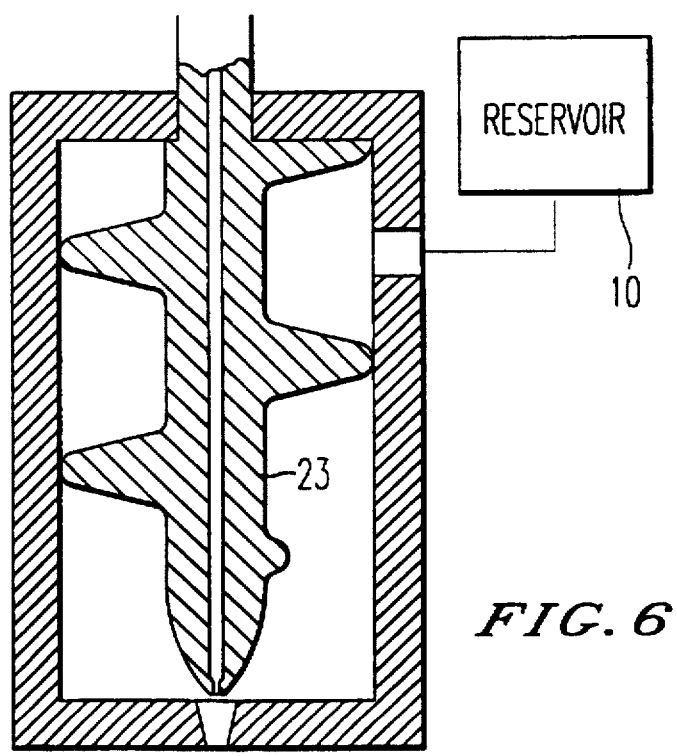
FIG. 6 is a schematic view of an extruder with a screw.

The pitch of spinner 8 differs from that of the bores 16 in rod 17 by a constant factor. The pitch of the spinner is in particular a specific amount higher than that of the bores. The reservoir 10 mentioned in conjunction with FIG. 1 can for example be an extruder with a piston 22 or screw 23 (as shown in FIGS. 5 and 6).

Figure 3:
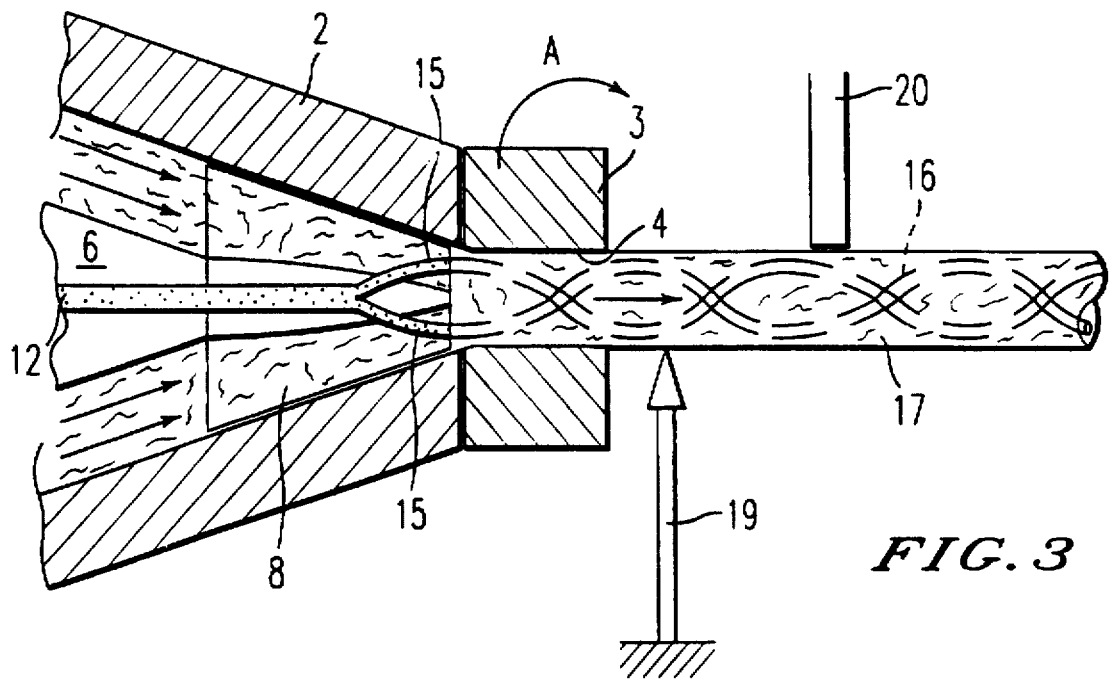
FIG. 3 is a schematic longitudinal section through another version of the extruder.
Figure 4:
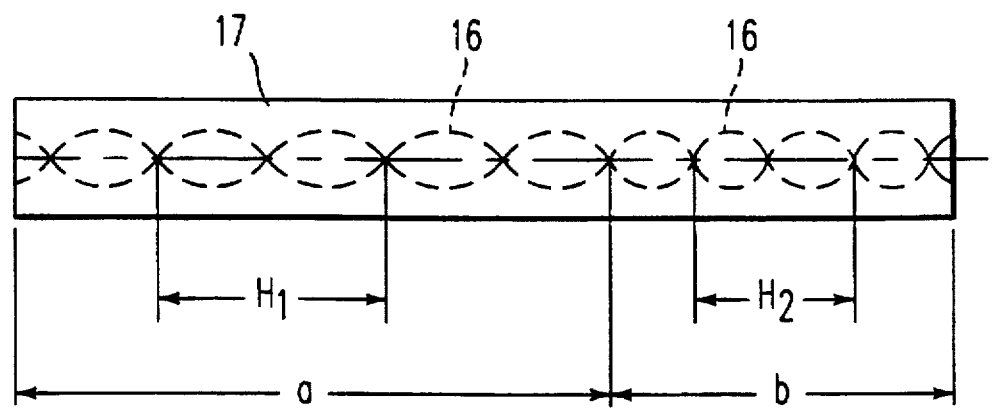
FIG. 4 illustrates a billet or rod with helical bores that differ in pitch.

FIG. 3 illustrates another version of the extruder. Outlet 3 rotates along with smooth cylindrical channel 4 around its longitudinal axis in the direction indicated by arrow A. The outlet can rotate freely, entrained by the circumferential component of the friction of the emerging mass. This approach considerably reduces friction and hence the wear on outlet 3. In order to directly control the torsion on the mass and hence the pitch of bores 16, however, outlet 3 can in a practical way be powered from outside by drive mechanism 24. The outlet can accordingly be rotated at a particular rate that can be adjusted to specific requirements. Depending on the speed and direction of the rotation of outlet 3, the torsion on the emerging rod 17 can be increased or decreased. The superimposed rotation of outlet 3 in other words can be employed to correct the torsion on the emerging material as required. Also in the vicinity of outlet 3 is a stationary marker 19 that applies indexing lines or stripes to the surface of the emerging rod 17 by spraying etc. The indexing lines are helical and precisely indicate the particular pitch of interior bores 16 resulting from the exit speed of the mass emerging from outlet 3 plus the torsion on the emerging mass occasioned by spinner 8 and outlet 3. Downstream of marker 19 is a sensor 20 that detects the instantaneous torsional pitch. In the event of discrepancies between the actual pitch and the desired pitch, the speed of the rotation outlet 3 can be changed for compensation, resulting in a rod 17 with bores 16 that have a precise pitch. When it is necessary to vary the pitch during the extrusion process, for bits that are to be employed in discontinuous drills for example, the variation can be ensured by appropriately varying the rate of rotation of outlet 3. FIG. 4 illustrates a rod 17 with bores 16 that exhibit a pitch $H_1$ in section a and a pitch $H_2$ in section b. An extruder with a rotating outlet 3 can also produce helical bores with a pitch that changes continuously, resulting in bores of high precision to accommodate any situation.

A stationary marker 19 can be provided, furthermore, in the vicinity of the outlet 3 for applying indexing lines or stripes to the surface of the rod. A downstream sensor 20, moreover, can detect the pitch of the lines or stripes.

I claim:

1. An extruder for extrusion manufacturing one of a hard metal and a ceramic rod with at least a helical inner bore and having a smooth outer surface substantially free of elevations and depressions, comprising:

a die;

means for twisting a plasticized mass of said one of said hard metal and said ceramic;

means for forcing said plasticized mass through said die such that a helical-shaped twisted mass is produced during extrusion wherein said mass is shaped in the form of a billet having a cross-section;

spinner means defining said twisting means located in said die, said spinner means being rotated by an axial flow of said mass through said spinner means;

an outlet located at an end of the die and downstream of the spinner means; and means for introducing a filament-shaped plasticized material into said mass, wherein said material follows a twisted movement of said twisted mass so as to form a helical inner bore therein;

said die having an interior coaxial mandrel mounting said spinner means wherein said filament-shaped material is introduced from the downstream end of said spinner means into said die at eccentrically arranged locations wherein said introducing means comprises a reservoir of plasticized material, said reservoir having one of a piston and a screw and said plasticized material comprises one of a readily evaporating material and a soluble material that are removable from said plasticized mass prior to sintering of said plasticized mass.

2. An extruder for extrusion manufacturing one of a hard metal and a ceramic rod with at least one helical inner bore and having a smooth outer surface substantially free of elevations and depressions, comprising:

a die;

a twisting mechanism twisting a plasticized mass of said one of said hard metal and said ceramic;

a forcing mechanism forcing said plasticized mass through said die such that a helically shaped twisted mass is produced during extrusion wherein said mass is shaped in the form of a billet having a cross-section;

a spinner defining said twisting mechanism and being located in said die wherein said spinner is rotated by said mass forced through said die;

an outlet fixed downstream of said die;

a mechanism introducing a filament-shaped material into said mass, wherein said material follows a twisting movement of said twisted mass so as to form a helical inner bore therein;

said die having an interior coaxial mandrel mounting said spinner wherein said filament-shaped material is introduced from a downstream end of said spinner into said die at eccentrically arranged locations.

3. An extruder for extrusion manufacturing one of a hard metal and a ceramic rod with at least one helical inner bore and having a smooth outer surface substantially free of elevations and depressions, comprising:

a die;

means for twisting a plasticized mass of said one of said hard metal and said ceramic;

means for forcing said plasticized mass through said die wherein said mass is shaped in the form of a billet having a cross-section;

spinner means defining said twisting means and being located in said die for twisting said mass uniformly over the cross-section of the billet, said spinner means being surrounded by an axial flow of said mass; and an outlet positioned in proximity with a downstream portion of said die such that said mass emerges from a channel through said die and said outlet;

said die having an interior coaxial mandrel mounting said spinner means and including means for introducing a filament-shaped plasticized material from a downstream end of said spinner means wherein said introducing means includes a reservoir of said plasticized material, said reservoir having one of a piston and a screw and said plasticized material comprises one of a readily evaporating material and a soluble material that are removable from said plasticized mass prior to sintering of said plasticized mass.

4. An extruder as claimed in claim 3, wherein said channel through said outlet is a smooth cylindrical channel.

5. An extruder for extrusion manufacturing one of a hard metal and a ceramic rod with at least one helical inner bore and having a smooth outer surface substantially free of elevations and depressions, comprising:

a die;

a twisting mechanism twisting a plasticized mass of said one of said hard metal and said ceramic;

a forcing mechanism forcing said plasticized mas through said die such that a helically shaped twisted mass is produced during extrusion wherein said mass is shaped in the form of a billet having a cross-section;

a spinner defining said twisting mechanism and twisting said mass uniformly over the cross-section of the billet, said spinner being surrounded by an axial flow of said mass; and an outlet positioned in proximity with the downstream portion of said die such that said mass emerges from a channel through said die and said outlet; said die having an interior coaxial mandrel mounting said spinner; and a mechanism introducing a filament-shaped article of plasticized material into said mass from said spinner wherein said introducing mechanism comprises a reservoir of said plasticized material, said reservoir having one of a piston and a screw and said plasticized material comprises one of a readily evaporating material and a soluble material that are removable from said plasticized mass prior to sintering of said plasticized mass.

6. An extruder for extrusion manufacturing one of a hard metal and a ceramic rod with at least one helical inner bore and having a smooth outer surface substantially free of elevations and depressions, comprising:

a die;

means for twisting a plasticized mass of said one of said hard metal and said ceramic;

means for forcing said plasticized mass through said die such that a helical-shaped twisted mass is produced during extrusion wherein said mass is shaped in the form of a billet having a cross-section;

a spinner defining said twisting means and being located in said die, said spinner being rotated by an axial flow of said mass through said spinner;

an outlet positioned in proximity with a downstream portion of said die such that said mass emerges from a channel through said die;

means for introducing a filament-shaped article into said mass from a downstream end of the spinner; and a sensor detecting the pitch of the mass emerging from the channel;

said die having an interior coaxial mandrel mounting said spinner.

7. An extruder as claimed in claim 6, which comprises a reservoir having one of a piston and a screw wherein said reservoir is communicated with said introducing means.

8. An extruder for extrusion manufacturing one of a hard metal and a ceramic rod with at least one helical inner bore having a smooth outer surface substantially free of elevations and depressions, comprising:

a die;

a twisting mechanism twisting a plasticized mass of said one of said hard metal and said ceramic;

a forcing mechanism forcing said plasticized mass through said die such that a helically twisted mass is produced during extrusion wherein said mass is shaped in the form of a billet having a cross-section;

a spinner defining said twisting mechanism and ting located in said die wherein said spinner is rotated by said mass forced through said die; and an outlet positioned in proximity with the downstream portion of said die such that said mass emerges from a channel through said die;

a mechanism introducing a filament-shaped article into said mass from a downstream end of said spinner; and a marker located downstream of the outlet to apply one of an indexing line and indexing strip to the mass emerging from the die;

said die having an interior coaxial mandrel mounting said spinner.

9. An extruder for extrusion manufacturing one of a hard metal and a ceramic rod with at least a helical inner bore and having a smooth outer surface substantially free of elevations and depressions, comprising:

a die;

means for forcing said plasticized mass through said die wherein said mass is shaped in the form of a billet having a cross-section;

spinner means located in said die;

an outlet located at an end of said die and downstream of the spinner means wherein said outlet twists said plasticized mass;

means for introducing a filament-shaped plasticized material into said mass, wherein said material follows a twisted movement of said twisted mass so as to form a helical inner bore therein;

said die having an interior coaxial mandrel mounting said spinner means wherein said filament-shaped material is introduced from the downstream end of said spinner means into said die at eccentrically arranged locations wherein said introducing means comprises a reservoir of said plasticized material said reservoir having one of a piston and a screw and said plasticized material comprises one of a readily evaporating material and a soluble material that are removable from said plasticized mass prior to sintering of said plasticized mass.

10. An extruder as claimed in claim 9, wherein said outlet has a smooth cylindrical channel.

11. An extruder as claimed in claim 9, wherein said outlet comprises a rotatable outlet.

* * * * *